United States Patent
Naess et al.

(10) Patent No.: US 7,318,901 B2
(45) Date of Patent: Jan. 15, 2008

(54) DEVICE FOR OXYGENATING SEA WATER

(75) Inventors: Anders Naess, Son (NO); Martin Gausen, Surnadal (NO)

(73) Assignee: Oxsea Vision AS, Surnadal (NO)

( * ) Notice: Subject to any disclaimer, the term of this patent is extended or adjusted under 35 U.S.C. 154(b) by 365 days.

(21) Appl. No.: 10/489,357

(22) PCT Filed: Sep. 12, 2002

(86) PCT No.: PCT/NO02/00322

§ 371 (c)(1),
(2), (4) Date: Aug. 24, 2004

(87) PCT Pub. No.: WO03/024578

PCT Pub. Date: Mar. 27, 2003

(65) Prior Publication Data

US 2005/0006315 A1    Jan. 13, 2005

(30) Foreign Application Priority Data

Sep. 14, 2001    (NO) .................................. 20014495

(51) Int. Cl.
*C02F 1/72* (2006.01)
(52) U.S. Cl. ..................... 210/758; 210/220; 261/121; 261/124
(58) Field of Classification Search ............... 210/758, 210/220; 261/121, 124
See application file for complete search history.

(56) References Cited

U.S. PATENT DOCUMENTS

| | | | |
|---|---|---|---|
| 3,970,731 A | 7/1976 | Oksman | |
| 4,271,099 A | 6/1981 | Kukla | |
| 4,640,803 A | 2/1987 | Schmidt-Kufeke | |
| 4,776,127 A | 10/1988 | Jackson | |
| 4,927,568 A | 5/1990 | Campau | |
| 4,929,397 A * | 5/1990 | Jager | ........................ 261/65 |
| 5,893,337 A | 4/1999 | Sevic | |
| 6,155,794 A | 12/2000 | Wu | |

FOREIGN PATENT DOCUMENTS

| | | |
|---|---|---|
| DE | 2635606 | 8/1976 |
| DE | 26 35606 | 2/1978 |
| DE | 3218 460 | 11/1983 |
| DE | 3508593 | 9/1986 |
| DE | 351 3368 | 11/1986 |

(Continued)

OTHER PUBLICATIONS

IPER Seperate Sheet From PCT/NO02/00322, Dec. 11, 1002.

(Continued)

*Primary Examiner*—Robert A. Hopkins
(74) *Attorney, Agent, or Firm*—Christian D. Abel (57) ABSTRACT

A diffuser hose for oxygenation of water, in aquaculture installations for marine organisms in the sea. The hose (5) consists of a perforated hose (6), to which substantially pure oxygen is supplied, and at least one perforated hose for oxygen distribution (7), wherein the supply hose has fewer perforations/holes/pores than the distribution hose, thereby providing pressure equalization. Diffuser hoses herein provide for the formation of oxygen microbubbles with an oxygen partial pressure that is such that the oxygen passes into the water in the fish farm.

29 Claims, 9 Drawing Sheets

FOREIGN PATENT DOCUMENTS

| | | |
|---|---|---|
| DE | 4002694 | 8/1991 |
| DE | 20002 392 | 10/1999 |
| DE | 20002392 | 9/2000 |
| EP | 523 202 | 8/1992 |
| GB | 82 43 76 | 11/1959 |
| JP | 49-107890 | 9/1973 |
| JP | 56-61934 | 5/1981 |
| JP | 56-073528 | 6/1981 |
| JP | 06046717 | 2/1994 |
| JP | 2000-84588 | 3/2000 |
| NO | 307648 | 8/1994 |
| NO | 2000 4513 | 8/2000 |
| SE | 458 434 | 9/1989 |
| WO | WO 01/87052 | 11/2001 |

OTHER PUBLICATIONS

ISR From PCT/NO02/00323, Dec. 11, 2002.
Norwegian Search Report From Appl. No. 2001 4495, Feb. 22, 2002.
International-Type Search Report No. 01/00005 From the Swedish Patent Office, Mar. 22, 2002.
ISR From PCT/NO01/00207, Jun. 3, 2002.
Norwegian Search Report From Appl. No. 2000 4513, Nov. 16, 2000.

* cited by examiner

DEVICE FOR OXYGENATING SEA WATER

The present invention relates to a device for use in oxygenating water in aquaculture installations for marine organisms in the sea by means of oxygen-rich microbubbles, together with a method for using such a device.

In many fish farms in sea water, low oxygen levels are registered during certain periods. Reports have been received from some fish farmers that the oxygen content during such periods can be as low as 3-4 mg/litre at 14-15° C., which corresponds to an oxygen saturation of only 40%. The periods may be of shorter or longer duration, and occur particularly when the sea temperature is high, after feeding and in the evening/at night when there is high respiratory activity in the algae.

The fish have trouble in surviving at an oxygen saturation as low as that mentioned above. A farmer will note that the fish do not eat, and that they usually swim in the upper layers of water, gasping for oxygen. In general, low oxygen saturation will lead to both reduced feed utilisation and reduced growth, and experiments have shown that even an oxygen saturation of as much as 85% can give this result, although without a decline in appetite or altered behaviour in the fish. The problems associated with low oxygen saturation can therefore occur without a farmer being able to observe any obvious symptoms in the fish.

Fish are ectothermal animals with a metabolism that is dependent on the sea temperature. A high sea temperature gives a high metabolic rate, good appetite and mobility. This results in substantial oxygen requirements, which have to be covered from the surrounding mass of water. If the oxygen saturation in the water is low, it will lead to a reduced metabolic rate. A reduced metabolic rate leads to a lower rate of growth, less efficient feed utilisation since the feed is not absorbed but is pushed through the gut undigested, and reduced resistance to disease.

In the period July-October it is presumed that it is the access to oxygen that is the limiting factor for maximum feed utilisation and growth in sea water. If it had been possible to increase this to normal saturation during periods with low oxygen saturation, substantial gains could have been achieved in the form of a lower feed factor, increased rate of growth, increased production capacity (higher fish density) and greater resistance to disease as a result of lower environmental stress. However, there are no known solutions in existence at present that enable generator-produced oxygen to be added in an efficient manner in large amounts and over a long period to water in open cage installations.

There is equipment in existence at the present time for oxygenating water for farmed salmon and trout while they are still located in land-based installations. In this case the water source is essentially fresh water, which runs into the fish farm by means of gravity. In the period when the fry have to adapt to life in the sea (smoltification), sea water is gradually added to the installation. Both the water sources require oxygenation, and this can be done substantially in two ways; oxygenation in pressurised water systems (cone, tank or the like with a sufficiently high pressure to enable the gas/gases (oxygen plus some nitrogen) to be dissolved in the water and bind to the water molecules, or diffusion by means of small bubbles (microbubbles). However, none of these two oxygenation methods are suitable for oxygenation of aquaculture installations for marine organisms in the sea.

In addition to the above, there is currently on the market a perforated hose that is used for emergency oxygenation, delousing in cages and transport of living fish. The hose, however, is not employed during normal operation in fish farms, and it is not capable of distributing the oxygen uniformly, and over a long period, in an aquaculture cage. This is due to the construction of the hose, which causes it to be filled with water, thereby becoming highly unstable. Water consists of 30-35% salt, and oxygen dosed through the hose will consequently dry up the water with the result that the salt crystals are left behind in the hose and gradually clog the pores.

JP 06046717 describes a system for adding air or oxygen to a pressurised water system/aquaculture cage. Oxygenation in pressurised water systems, as implemented in the land-based installations, however, is not suitable for oxygenation of cages, since it will be extremely expensive to construct and operate a corresponding system out in a cage. Nor is it possible to add generator-produced oxygen directly to a cage (i.e. without first having dissolved the gas/gases in water, which is in a pressurised system) since it could lead to nitrogen supersaturation of the water, which in turn can cause the fish to contract decompression sickness ("the bends") and die.

Two patents that describe systems for adding air onshore/ in containers in the form of bubbles are U.S. Pat. No. 4,927,568 and U.S. Pat. No. 4,776,127. However, these patents regard the addition of oxygen in a live-well on a boat and an aquarium respectively. Diffusion by means of microbubbles, as this is implemented on the land-based installations, takes place by means of s consisting of a solid material (ceramics, sintered metal or the like). This kind of diffusion, however, is not suitable for diffusion in sea water over long periods since the sea water, which penetrates the element, will evaporate on the addition of oxygen, and the salts that remain will clog the pores in the elements over time.

U.S. Pat. No. 3,970,731 describes a for producing bubbles, where the is lowered into a liquid. The is equipped with special indentations, whose purpose is to help to collect the bubbles from the pores before they are released into the environment. Consequently, the point of this is not to release microbubbles, as is the case with the present invention, but to release bubbles that are larger than those issuing from the pores.

In connection with the removal of salmon lice, ceramic s are currently employed for short periods (2 hours-1 day) for adding oxygen to cages. An oxygen admixture of this kind is carried out since the cage(s) that have to be treated are closed by a tarpaulin before the injection of chemicals that kill the lice, and closing the cage in this way leads to a reduced through-flow of water and stressed fish. As already mentioned, however, ceramic s of this kind are not suitable for diffusion in sea water over a long period, and there is no permanent system in use today for oxygenating cages in the sea.

In periods (July-October) with oxygen saturation values below 85%, approximately 0.65 kg of oxygen supplied to the fish will yield approximately 1 kg extra produced amount of fish. This can give a production gain of 5-20%. At a location where 1000 tons of fish are produced, therefore, after deducting the costs of increased oxygen supply, a profit of around NOK 2-6 million may be involved. The aquaculture business is therefore in a situation where the gains, environmental as well as financial, make it desirable to have a device that can provide the injection of oxygen into sea water in cages.

Thus it is an object of the invention to provide a device for oxygenating water in aquaculture installations for marine organisms at sea by means of oxygen-rich microbubbles, together with a method for using the device.

This object is achieved with the present invention, characterised by the enclosed claims.

The invention relates to a doffiser hose, together with a method for oxygenating water in aquaculture installation for marine organisms in the sea wherein substantially pure oxygen in the form of oxygen-rich microbubbles is added to the installation using the diffuser hose according to the present invention.

The diffuser hose of the present invention is connected to equipment for oxygen gas production and supply of oxygen gas, which may be produced on site and which is stored in a tank (4) suited to the purpose, wherein said hose consists of a perforated hose for oxygen supply (6) and at least one perforated hose for oxygen distribution (7), wherein the supply pipe has fewer perforations/holes/pores than the distribution pipe, thereby providing a pressure equalisation.

The present diffuser hose, and method for oxygenating water, possibly with minor adjustments that will be of no consequence for the actual concept of the invention, may also be used for oxygenating sea water in fish farms of other types, such as, for example, fish farms for shellfish or crayfish.

The invention will now be described in greater detail, with reference to figures and examples.

Figure 1A:
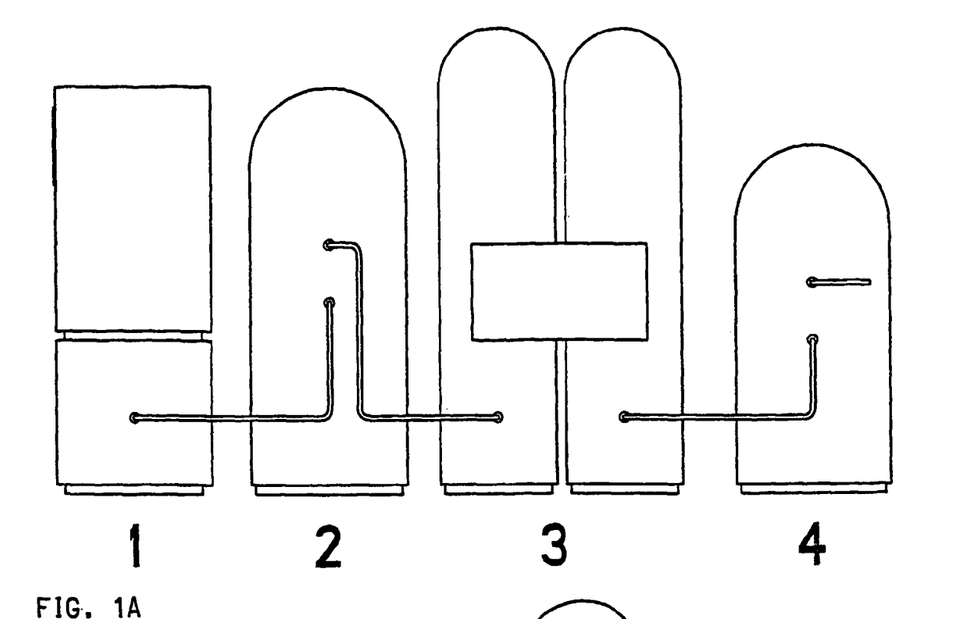
FIG. 1a) and b) illustrate an air compressor/air dryer 1, a storage tank for air 2, oxygen generator 3 and pressure tank 4 for storing oxygen.
Figure 1B:
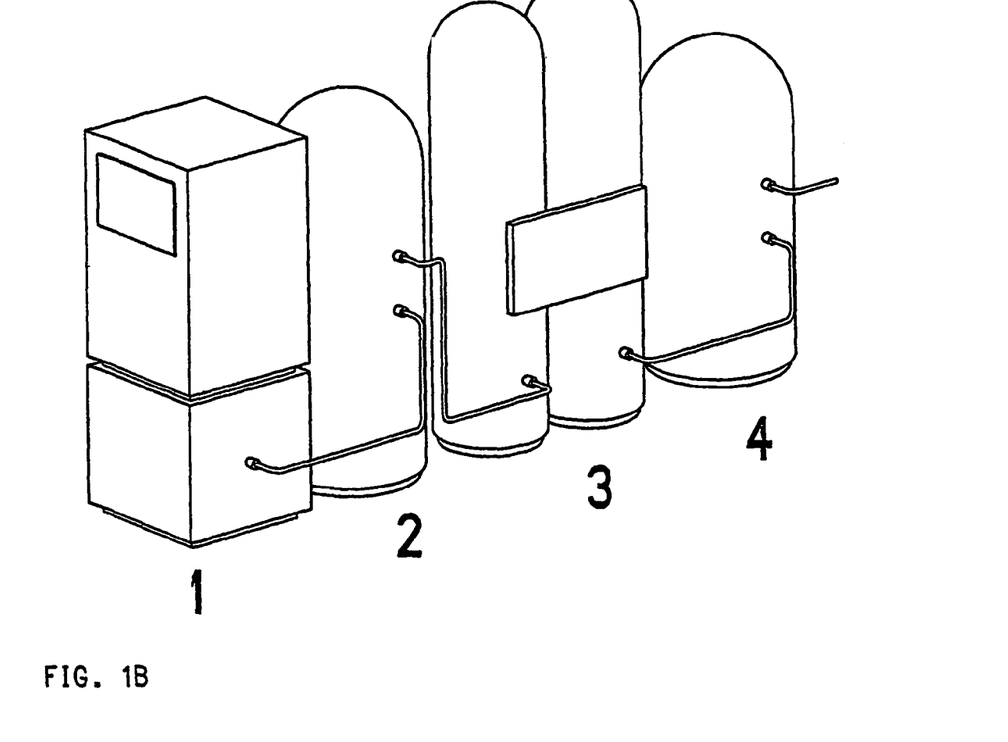

The oxygen that has to be added to the cage may be produced on site by means of oxygen generators. Air is sucked into an air compressor 1, where it is dried and filtered. The dried and filtered air is then passed on to a storage tank for air 2, which is a pressure tank for intermediate storage of pure air. The pure air is then fed to an oxygen generator 3, which by means of a separation medium produces oxygen. This is accomplished by the air being forced by means of overpressure into a tank containing a porous material (ceolitt). This material will adsorb the nitrogen, while the oxygen passes on to the second tank in the oxygen generator 3, thereby producing oxygen in an efficient and inexpensive manner. The method is called Pressure Swing Adsorption (PSA). The gas produced is stored in a storage tank (pressure tank) for oxygen 4, before further distribution.

The oxygen gas produced in this manner has a purity of approximately 90-95%. The remaining 5-10% is mainly nitrogen and argon. In order to avoid nitrogen supersaturation of the water, and thereby decompression sickness in the fish when this oxygen is added to the sea water, this type of admixture must be carried out in the form of bubbles. Since nitrogen is underrepresented inside a bubble, only nitrogen will pass from the water into the bubble, and consequently no nitrogen supersaturation of the water will occur.

According to the present invention, the bubbles that are added to the sea water are oxygen-rich microbubbles. One of the advantages of adding oxygen in the form of such microbubbles is their ability to "float" in the mass of water and their low speed of ascent, resulting in a uniform distribution of the microbubbles/oxygen in the water that has to be oxygenated, and a relatively long contact time with this water. Since large bubbles ascend more rapidly to the surface than small bubbles, the distribution of the oxygen in the mass of water will not be as good when adding large bubbles. In addition, the mass transport (diffusion over the bubble membrane) will be greater for small bubbles compared with large bubbles, since small bubbles have a large surface in relation to volume.

Liquid oxygen from a cryotank (LOX) can also be used for oxygenation of open cages and therefore should not be ruled out as an oxygen source, but this will not represent a very cost-effective alternative in present day fish farms. This kind of oxygen often has a purity of approximately 99.5%, but the purity of the oxygen gas otherwise is of no great importance when it is added in the form of microbubbles. However, the addition of pure air (approximately 20% oxygen) to the water in the cages will not be expedient as it will lead to an increase in the partial pressure of $N_2$, thereby exposing the fish to decompression sickness.

As a result of the partial pressure difference between the oxygen-rich microbubbles and the oxygen in the mass of water, the oxygen in the bubbles will very quickly diffuse from the bubbles to the mass of water, and subsequently into the fish's gills and blood. By means of the present device and according to the present invention, a driving gradient is consequently created, since the partial pressure of the oxygen in the bubbles is greater than in the mass of water, which in turn has a higher partial pressure than the fish's blood. The higher the partial pressure difference, the faster and more efficiently the diffusion process advances. The partial pressures of gases other than oxygen in the bubbles are low, which means that gases such as nitrogen, carbon dioxide and ammonia ($NH_3$) will only diffuse into the bubbles. These are gases that are considered to be limiting for the fish's growth, and which are thereby removed from the mass of water when the bubbles "burst" in the surface. This effect therefore contributes to a further advantage of using the present method.

The above part of the invention is also described in a previously submitted, but unpublished, patent application of the applicant (No. 2000 4513).

Figure 4A:
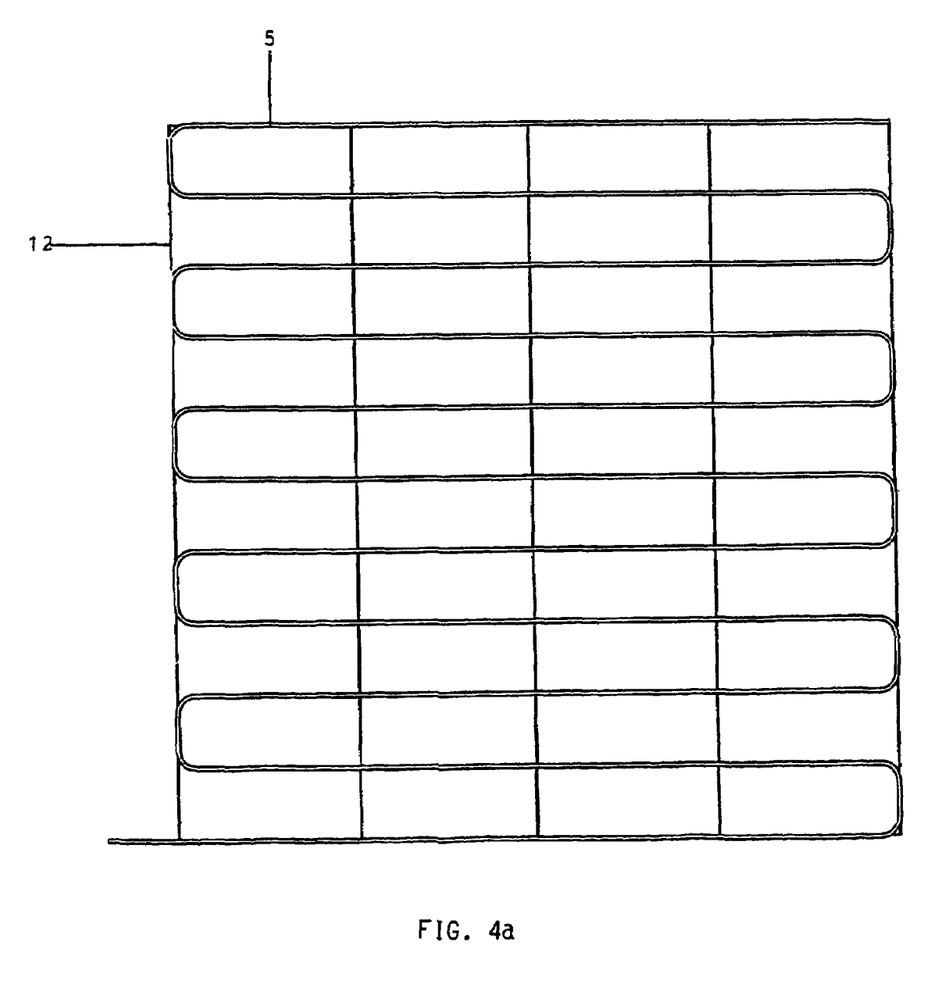
FIG. 4a) illustrates an attachment device 12 for one (or more) hoses 5; b) illustrates an attachment device 12 for one (or more) hoses 5; c) illustrates an attachment device 12 for one (or more) hoses 5.
Figure 4B:
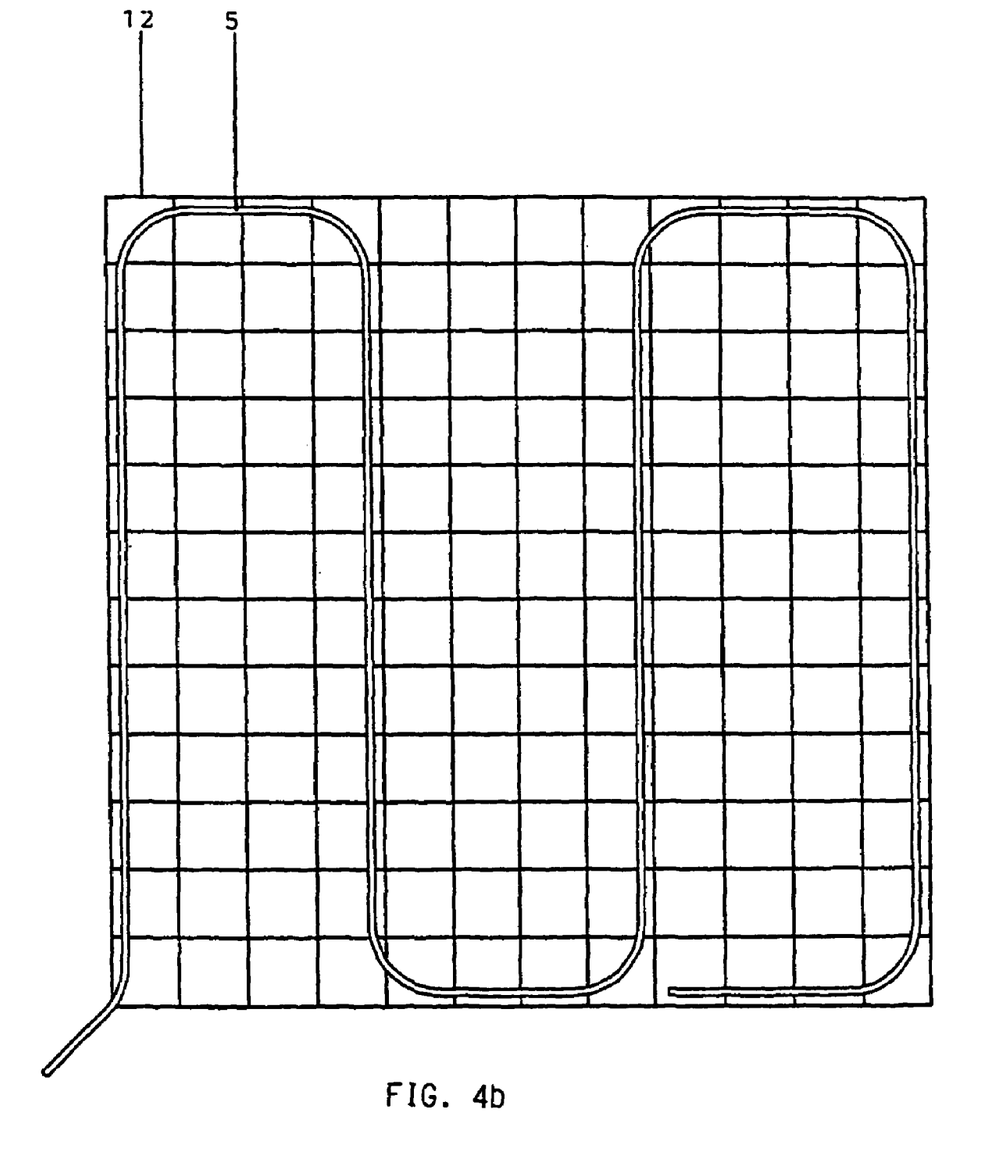
Figure 4C:
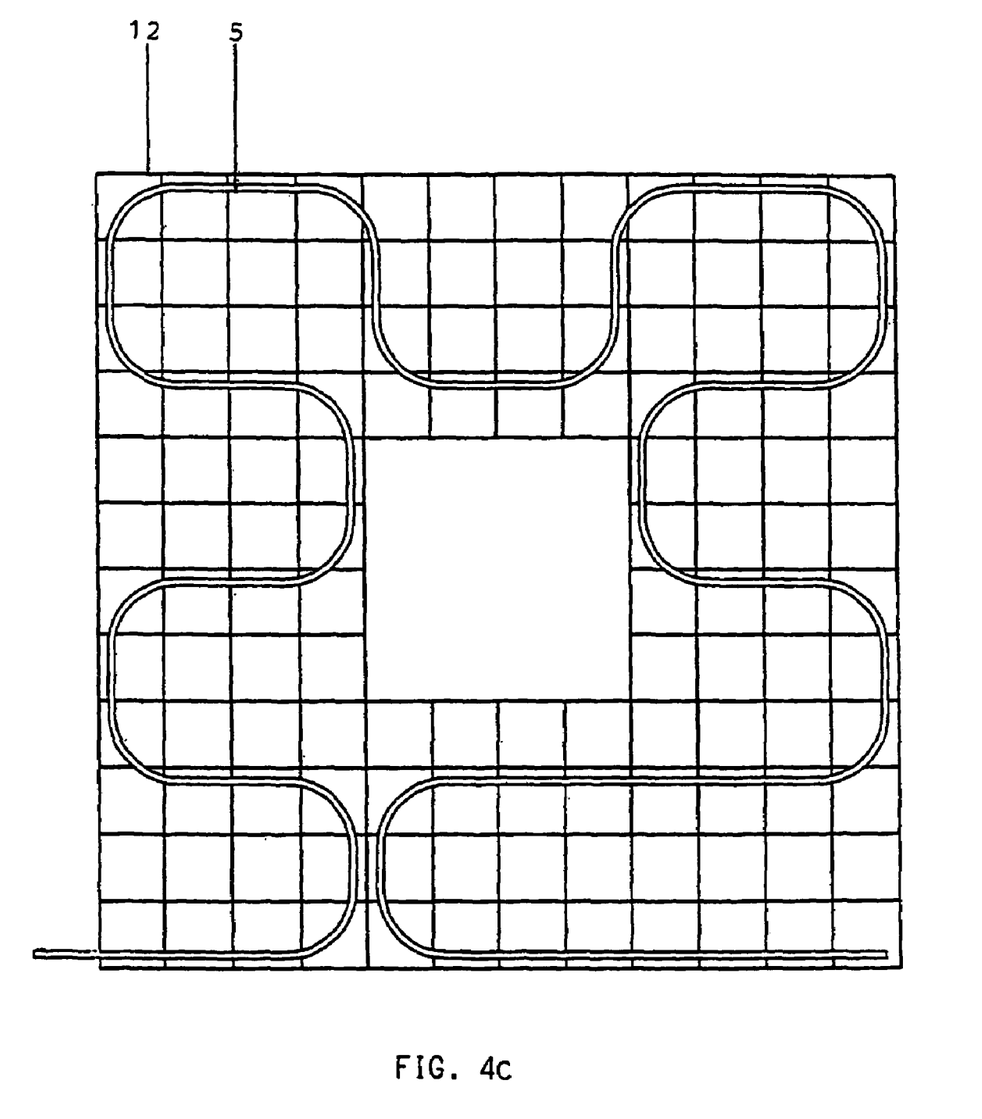
Figure 5A:
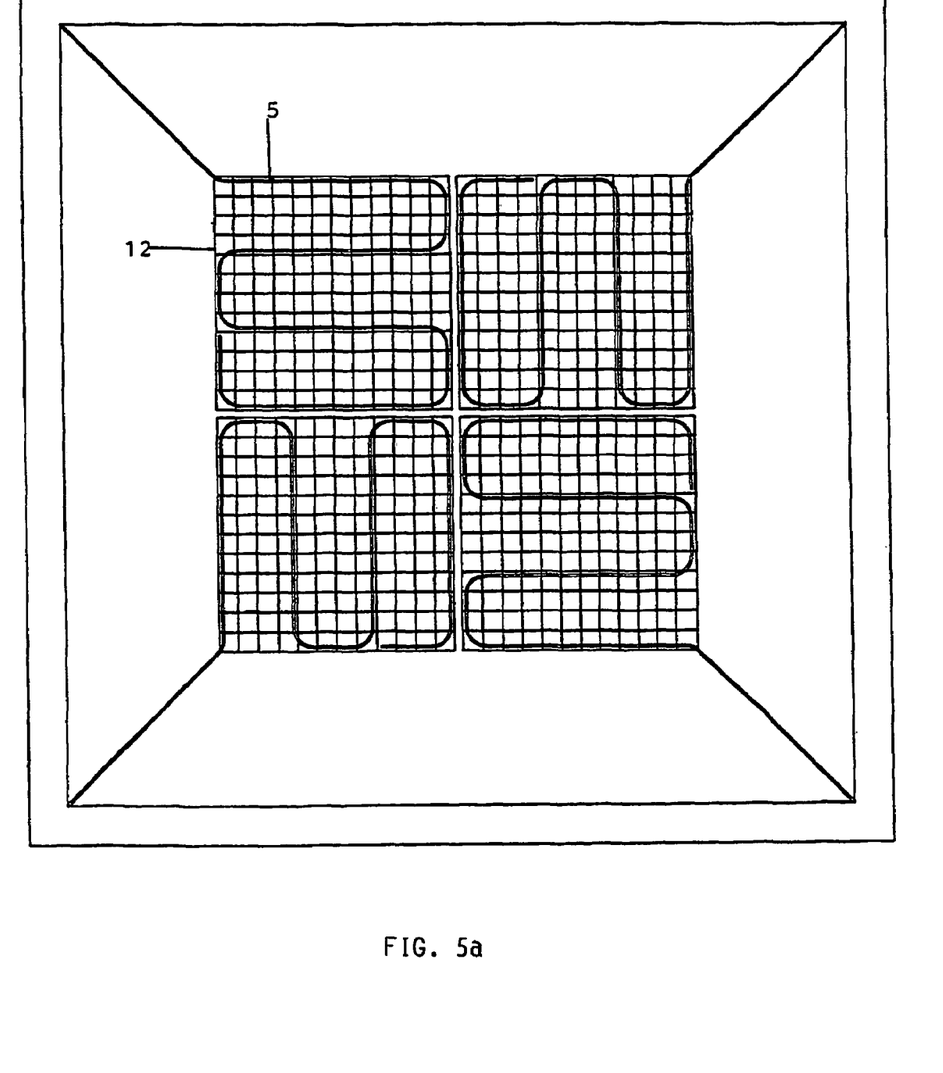
FIG. 5a) is a view from above of several attachment devices 12 (with hoses 5), which are interconnected; b) is a view from the side of several attachment devices (with hoses 5), which are interconnected.
Figure 5B:
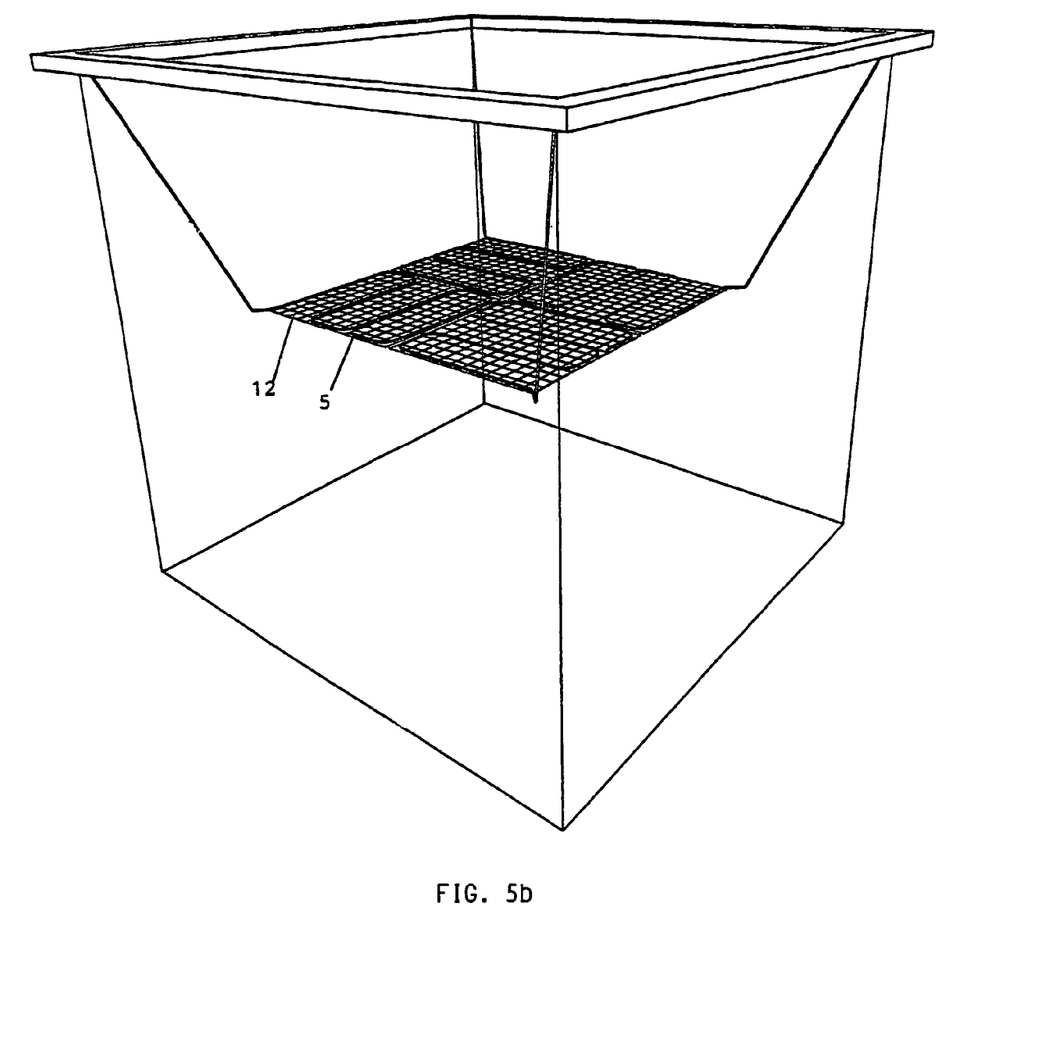

The oxygen from the storage tank 4 is distributed by means of hoses and pipes to each individual cage. In the cage the oxygen is added by means of one or more hoses 5, which are attached to a suitable attachment device 12, which is lowered into the water. Since the cages may have different shapes and volume, it may be expedient to use different configurations of hoses 5 and/or attachment devices 12 for these, and examples thereof are illustrated in FIG. 4. Several attachment devices 12 may be interconnected as illustrated in FIG. 5, and the actual attachment device 12 may, e.g., consist of chain, wire, pipe and/or rope.

One or more hoses 5 are mounted on an attachment device 12 in such a manner that the hose(s) 5 are held in as stable a manner as possible in the horizontal plane. The length of a hose 5 mounted in an attachment device 12 may be from 0.5-2000 metres, preferably 1-1000 metres, more preferably 10-100 metres. If there are several hoses 5 connected to an attachment device 12, these may form different "modules" in the "network", thus enabling the oxygen dosage to be varied to suit the different "modules" depending, e.g., on varying water through-flow.

The ideal position for an attachment device 12 with hose(s) 5 is such that bubbles are diffused through the entire horizontal cross section of a cage. The area of the cage that should be covered by hose(s) 5 will vary, however, depending amongst other things on the local through-flow of water in, and the depth of the cage. The suspension of the actual attachment device 12 for hose(s) 5 should be adjustable (e.g. by means of a wire, rope, hook and/or pulley system that is suspended above the cage, or by means of attachment devices in the actual support structure of the cage) in relation to the water depth at which the oxygen requires to be added. The oxygen can be added at a depth of from 2-35 metres, but it will be most expedient to add the bubbles at a depth of from 5-10 metres.

A hose 5 according to the present invention consists of (at least) two hoses; a first hose 6, which has a small number of perforations/holes/pores in the longitudinal direction, e.g. 1-100 per metre, preferably 1-10 per metre, and a second hose 7, which has a large number of perforations/holes/pores in the longitudinal direction, e.g. from 200 to 10000 per metre, preferably 500-2000 per metre. In the present description "hose" should be understood to refer to an elongated tubular body of any kind of material, but preferably consisting of ethene propene rubber (EPDM), but which may also consist of hard plastic or metal.

Figure 2A:
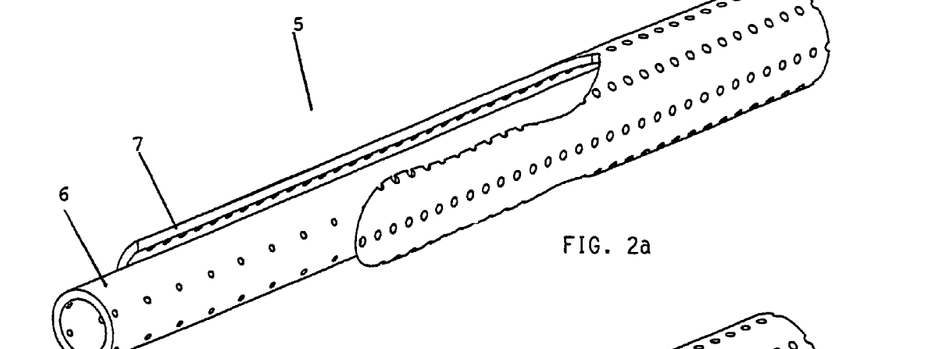
FIG. 2a) illustrates an embodiment of a hose 5 consisting of a first 6 and a second 7 hose, where the first hose 6 has few perforations/holes/pores and the second hose 7 has many perforations/holes/pores, and where the first 6 and the second 7 hose are arranged in such a manner that the first hose 6 is located inside the second hose 7; b) illustrates areas 8 on the first hose 6 that have a particularly robust construction where the second hose 7 can be attached/sealed by means of an external tightening ring 9, thereby causing the continuous formation of chambers/sections in the space between the first 6 and the second 7 hose, and a design where there is an internal rigid pipe 11 inside the first hose 6.
Figure 2B:
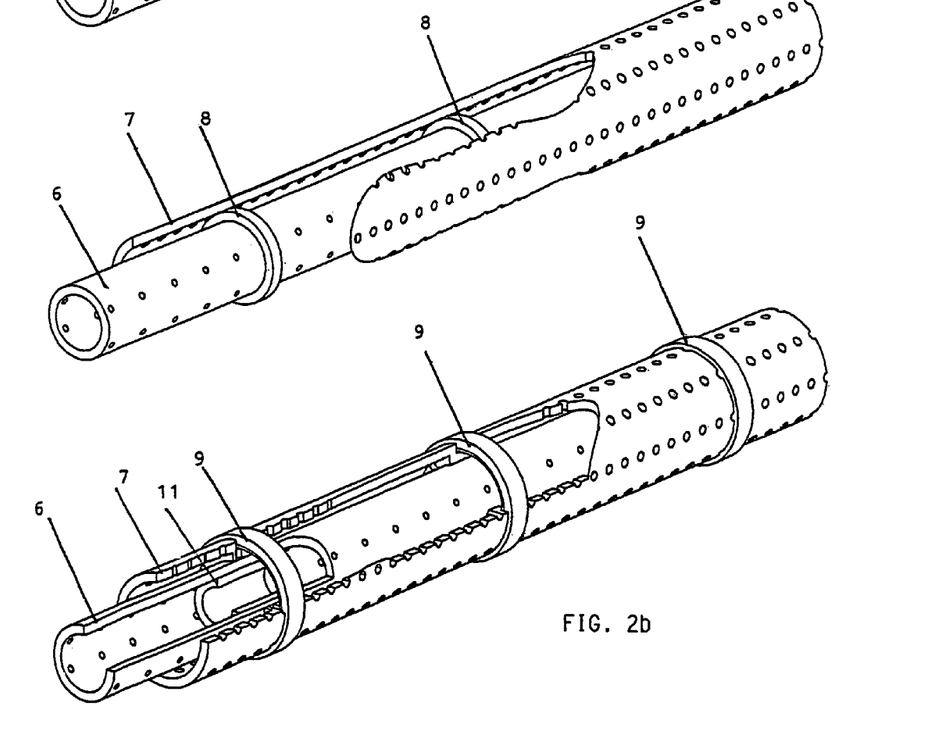
Figure 3A:
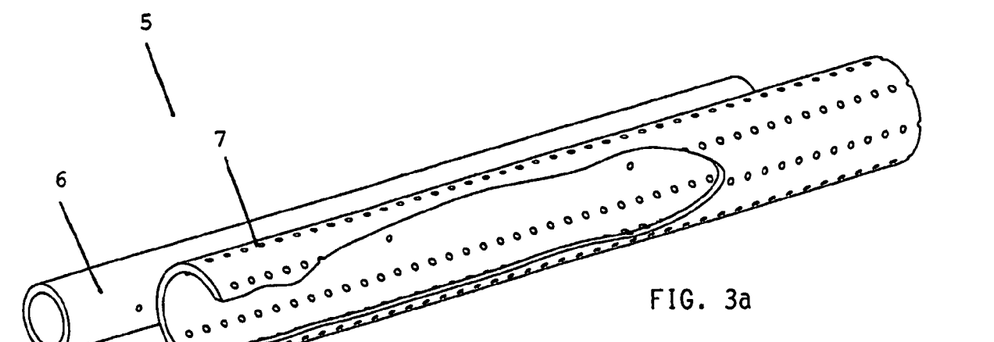
FIG. 3a) illustrates an embodiment of a hose 5 consisting of a first 6 and a second 7 hose, where the first hose 6 has few perforations/holes/pores and the second hose 7 has many perforations/holes/pores, and where the first 6 and the second 7 hose are arranged in parallel and located close together and are vulcanised together during production; b) illustrates fixed partitions 10 and an internal rigid pipe 11 inside the second hose 7.
Figure 3B:
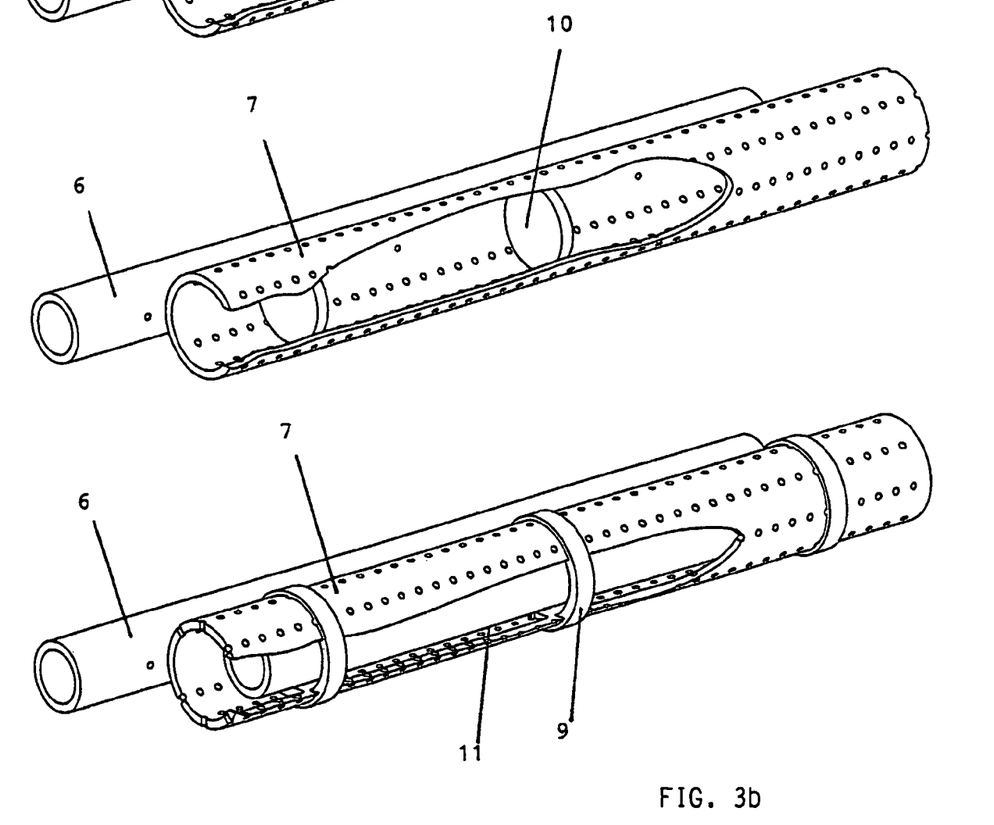

The first 6 and the second 7 hose may, according to the present invention, be arranged, for example, so that the first hose 6 is located inside the second hose 7 (FIG. 2). Alternatively, the first 6 and the second 7 hose may lie parallel to each other and close together, so that they are in contact with each other (have a common hose wall) in the longitudinal direction (FIG. 3) where there are perforations/holes/pores, thus enabling an internal gas transport to take place between the first 6 and the second 7 hose. This kind of embodiment of the hoses 5 may be achieved, for example, by having the first hose 6 and the second hose 7 produced/moulded/vulcanised together, or by having the hoses glued together after production. The second hose 7 may be produced with or without an extending tightening ring 9.

The design of the first hose 6 may be such that the perforations/holes/pores on the first hose 6 are arranged along its circumference and in a longitudinal direction, or on one (or more adjacent) row(s)/rank(s) in the longitudinal direction. When the first 6 and the second 7 hose are moulded/vulcanised together, this row/rank forms a part of the first 6 and the second 7 hose's common hose wall. In both embodiments oxygen can diffuse from the first hose 6 into the second hose 7. For the second hose 7 the perforations/holes/pores are arranged along its circumference and in the longitudinal direction. The perforations/holes/pores on both the first 6 and the second 7 hose may also be arranged in other ways without this being of significance for the actual invention.

The oxygen pressure employed in oxygenating a cage depends on the oxygen source used, but is normally from 0.1-20 bar, preferably 1-6 bar. The oxygen is transported into the hose's 5 first hose 6, with the purpose of maintaining a certain pressure in this hose, e.g. 0.1-20 bar, preferably 0.5-8 bar. When the oxygen is transported on to the hose's 5 second hose 7, this pressure is reduced. The depressurisation that is thereby created between the hose's 5 first 6 and second 7 hose will ensure that the oxygen is uniformly distributed over most of the hose 5.

In order to further ensure that the oxygen is evenly and efficiently distributed, the second hose 7 may be blocked at regular intervals, e.g. once every 1-50 metres. By this means chambers/sections are established in the second hose 7 through the entire length of the hose 5, which in turn permits a pressure equalisation to be attained throughout the entire length of the hose. The goal is thereby achieved that the oxygen (in the form of microbubbles) is added uniformly to the water over the entire length of the hose, since the chambers/sections prevent the oxygen from "sliding" along the (entire) length of the hose even though it is exposed to substantial vertical motion.

There are a variety of possible embodiments for establishing chambers/sections in the second hose 7. When the first hose 6 is located inside the second hose (FIG. 2), an embodiment can be obtained where the structure of first hose 6 is so rigid at special points 8 that it is possible to clamp the second hose 7 tightly against the first hose 6 by means of an external tightening ring 9 on the second hose 7 at these points. A second embodiment may be that the first hose 6 has a rigid construction along its entire length, this being achieved by mounting an internal rigid pipe 11 of any kind of material (e.g. lead), which is closed at both ends, inside the first hose 6, thus forming chambers/sections when the second hose 7 is clamped against the first hose 6 by means of an external tightening ring 9. Alternatively, the first hose 6 itself may consist of, e.g., hard plastic or metal, with the result that the first hose 6 itself forms a rigid pipe against which the second hose 7 can be clamped or round which it can be tightened. When the first hose 6 is arranged parallel to the second hose 7 (FIG. 3), an embodiment for establishing chambers/sections may be to insert fixed partitions 10 in the second hose 7, or to mount an internal, rigid pipe 11 of any kind of material (e.g. lead), which is closed at both ends, inside the second hose 7, thus enabling it to be sealed tightly around the internal pipe 11 by means of an external tightening ring 9.

The through-flow of water in a cage can vary a great deal. The less through-flow/water replacement that takes place, the greater the need for the supply of oxygen. The water quality in a cage also varies, as does the biomass. In addition, several other parameters will cause the fish's oxygen requirement to vary in the course of a 24-hour period, and throughout the year as such. It is important to take these variations into consideration when adding oxygen, and this should be carried out in such a manner that an oxygen saturation should be achieved of from preferably 41%-85% and more preferably 85%.

Figure 6:
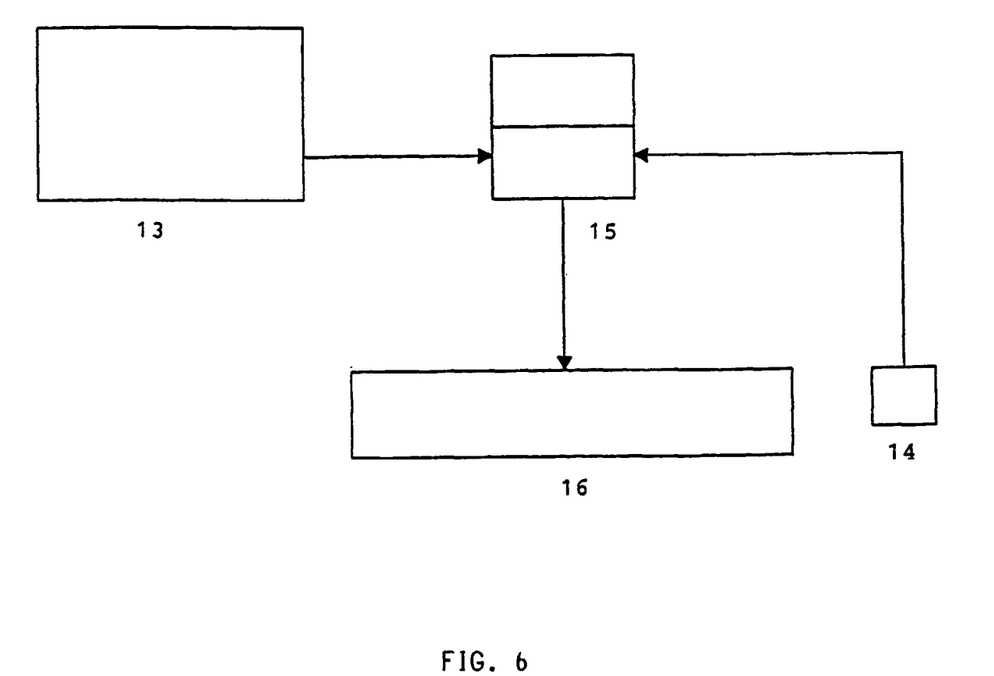
FIG. 6 is a flow chart illustrating oxygen production 13, oxygen probes/measurement 14, oxygen control/PLS 15 and oxygen admixture 16.

According to the present invention, this kind of desired oxygen saturation can be obtained by means of oxygen probes/sensors 14, which are located down in the water, and which at all times record the oxygen saturation in cages with oxygen admixture equipment. The amount of oxygen that is added to a cage is regulated against a given adjustment point (set point), and this set point for oxygen saturation is determined in a regulating unit (a PLS; programmable logic system) 15 or the like, which in turn transmits a signal to a control cabinet 15. The regulation of the amount of oxygen added is controlled herein by means of valves (preferably magnetic valves). From the storage tank for oxygen 13, therefore, all the oxygen gas passes through the control cabinet, which then distributes/adds 16 the correct amount of oxygen to each cage. Since this enables an approximately constant and desired oxygen saturation to be maintained in the cage, the fish will receive optimal conditions for their well-being and growth.

The following examples are intended to illustrate an embodiment of the present invention, and should in no way be considered limiting.

EXAMPLE 1

Oxygen Admixture by Means of Emergency Oxygenation Hose

An emergency oxygenation hose in four different lengths (1, 2, 4 and 8 metres), consisting of EPDM, was tested for injection of oxygen to sea water. The emergency oxygenation hose is perforated/holed approximately 1000 times per metre. An oxygen hose from an oxygen bottle with regulator and flow meter was connected to one (first) end of the emergency oxygenation hose, while the opposite (second) end was closed by an end plug/blind plug.

The tests were carried out in sea water (from the quay in Kragerø). Emergency oxygenation hose(s) were lowered into the water in such a manner that the second hose end (which was closed by an end plug/blind plug) was located closest to the seabed, and the opposite end (first end) as close to the surface as possible.

The emergency oxygenation hose(s) were thereby lying obliquely in the water column, and the height difference between the first and the second hose end was approximately 1-2 metres.

3 different quantities of oxygen were added (0.05, 0.2 and 0.5 kg oxygen/hour) to each of the emergency oxygenation hoses, and bubble pattern and size were visually observed, noted and photographed. The results of the tests with an emergency oxygenation hose are illustrated in Table 1 below.

TABLE 1

| Hose | Visual observations from tests using an emergency oxygenating hose | | |
|---|---|---|---|
| | Amount of O₂ | | |
| length (m) | 0.05 (kg/h) | 0.2 (kg/h) | 0.5 (kg/h) |
| 1 | Small bubbles Unevenly distributed | Large bubbles Partly evenly distributed | Very large bubbles Evenly distributed |
| 2 | Smaller bubbles Unevenly distributed | Larger bubbles Partly evenly distributed | Large bubbles Evenly distributed |
| 4 | Small bubbles + some large Unevenly distributed | Small bubbles + some large Unevenly/partly evenly distributed | Larger bubbles + many large Partly evenly distributed |
| 8 | Small bubbles + some large | Small bubbles + some large | Less small bubbles + some large |

TABLE 1-continued

| Hose | Visual observations from tests using an emergency oxygenating hose | | |
|---|---|---|---|
| | Amount of O₂ | | |
| length (m) | 0.05 (kg/h) | 0.2 (kg/h) | 0.5 (kg/h) |
| | Very unevenly distributed | Unevenly distributed | Unevenly distributed |

Uneven distribution means that most of the bubbles emerge from the hoses only in the part of the hose that is located closest to the surface, while no bubbles emerge from the hose in the part located closest to the seabed.

For the emergency oxygenation hoses of 4 and 8 metres large quantities of oxygen were also dosed in order to investigate the effect of overdosing and to see whether this created sufficient back pressure inside the hose to enable the oxygen to be uniformly distributed over the entire hose length. It was tested with approximately 2 to 5 kg oxygen/hour, but the bubbles did not change their pattern substantially from the tests with low oxygen dosages, and the bubbles were still unevenly distributed over the whole length.

EXAMPLE 2

Comparison of Oxygen Admixture by Means of Emergency Oxygenation Hose and Hose

In this example a known emergency oxygenation hose was tested against the hose 5 according to the present invention for adding oxygen to sea water.

In this test equal lengths (approximately 4 metres) of emergency oxygenation hose and hose 5 were employed. One (first) end of both emergency oxygenation hose and hose 5 was connected, by means of hose nipples and transport hoses (a hose that is completely watertight and transports oxygen from an oxygen source to a given receiver hose), to a common oxygen bottle with rotameter. The opposite (second) end of both the emergency oxygenation hose and the hose 5 (i.e. the second end of both the first 6 and second 7 hose) was closed by an end plug/blind plug, and a weight was attached to the second hose end (for both emergency oxygenation hose and hose 5), thus enabling it to sink to a depth of approximately 2 metres. The emergency oxygenation hose and the hose 5 were also connected by means of "strips" in order to ensure identical conditions for both the hoses during the test. The first hose end for both the emergency oxygenation hose and the hose 5 lay almost at the surface, with the result that both the hoses were lying obliquely in the water column with a height difference of approximately 2 metres. Oxygen was connected to both the hoses, and the oxygen supply was regulated alternately through the flow meter by means of a three-way needle valve. Different amounts of oxygen were dosed (from 0.1-2 kg oxygen/hour).

Hose 5 according to the present invention (arranged in such a manner that the first hose 6 is located inside the second hose 7; FIG. 2) was tested. The first hose 6 was a 14 mm EPDM hose with 1-2 perforations/holes/pores per metre, and the second hose 7 was a 28 mm EPDM hose with approximately 1000 perforations/holes/pores per metre. The end (first end) of the first hose 6 was connected to the transport hose (from the oxygen bottle) by means of two interconnected hose sockets, and by means of an external tightening ring (hose clamp) the first 6 and the second hose 7 were pressed/fixed/sealed around the hose socket. In a similar manner the hose's 5 second hose 7 was pressed/fixed/sealed at its second end around the first hose's 6 end plug/blind plug, thereby forming an internal space between the hose's 5 first 6 and second 7 hose.

Visual observations from the tests with emergency oxygenation hose against hose 5 are illustrated in Table 2 below.

TABLE 2

Visual observations from the comparison between emergency oxygenation hose and hose

| Test | Observation |
|---|---|
| Diffuser hose according to the present invention | Bubbles are distributed almost uniformly over the entire length of the hose (4 m) |
| Emergency oxygenation hose | Bubbles are distributed unevenly and only come out of the first few meters of the length of the hose (4 m) |

The emergency oxygenation hoses used in the test proved to be permeable to water and were filled with water after only a few minutes, which will prevent a uniform distribution of the oxygen bubbles. In an operating situation in a cage, hoses will always be subject to vertical motion on account of the different directions and speeds of the water currents through a cage, and water inside such a hose will always remain lying at the lowest point. Besides preventing oxygen from penetrating this part of the hose, the accumulation of water will also make such a device highly unstable. Consequently, an emergency oxygenation hose of this kind is not suitable for adding oxygen to cages in sea water.

In contrast to the emergency oxygenation hose, however, the hose 5 according to the present invention demonstrated a uniform distribution of oxygen over its entire length. Since the hose 5 consists of two hoses, with a first hose 6, which is not reinforced, water is essentially prevented from penetrating the hose 5. Any water penetrating the hose will only have a very limited volume between the first 6 and second 7 hose in which to be distributed.

The invention claimed is:

1. A diffuser for oxygenating water by providing micro bubbles in aquaculture installations for marine organisms in the sea, wherein the diffuser is attached to an equipment for oxygen gas production and oxygen delivery, which optionally may be produced on the spot and stored in a suitable tank (4), wherein said diffuser is a hose (5) comprising a perforated supply hose (6) and at least a perforated distribution hose (7), and wherein the supply hose comprises fewer perforations/holes/pores than the distribution hose and wherein the perforations/holes/pores in the supply hose (6) are located along its entire circumference and in the longitudinal direction, or in a row/rank in the supply hose's (6) longitudinal direction, and that the perforations/holes/pores in the distribution hose (7) are located along its entire circumference and in the longitudinal direction, and wherein the supply hose (6) and at least one distribution hose (7) are arranged with parallel axes located in abutment against each other, wherein the supply hose only has perforations in the contacting surface between said supply hose and the distribution hose(s), with a resultant correspondence between these contact surface perforations in the supply hose and the distribution hose.

2. A diffuser according to claim 1,
wherein the supply hose (6) and the distribution hose (7) have a common hose wall in the longitudinal direction.

3. A diffuser according to claim 2,
wherein there are perforations/holes/pores in the longitudinal direction of the common hose wall.

4. A diffuser according claim 3,
wherein the supply hose (6) in its longitudinal direction comprises 1-100 perforations/holes/pores per metre, and the distribution hose (7) in its longitudinal direction comprises 200-10000 perforations/holes/pores per metre.

5. A diffuser according to the claim 4,
wherein the diffuser hose is connected to oxygen probes/sensors (14) for registering the oxygen level in the water and a regulating unit/control cabinet (15) for regulation/controlling the oxygen supply from the tank (4) based on the information registered by the oxygen probe(s)/sensor(s).

6. A diffuser according to the claim 5,
wherein the oxygen admixture is controlled/regulated according to the oxygen saturation in the water that has to be oxygenated or a more closely specified adjustment point/set point.

7. A diffuser according to claim 6,
wherein the oxygen that is provided is liquid oxygen from a cryotank(s).

8. A diffuser according to claim 7,
wherein the supply hose (6) consists of 4-16 mm rubber, and that the distribution hose (7) consists of 6-30 mm rubber.

9. A diffuser according to claim 8,
wherein diffuser hose (5) is from 0.5-2000 metres.

10. A diffuser according to claim 9,
wherein one or more diffuser hoses (5) are mounted on an attachment device (12).

11. A diffuser according to claim 10,
wherein several diffuser hoses (5) are mounted in a network on the attachment device (12) so as to form separate modules.

12. A diffuser according to claim 11,
wherein several attachment devices (12) can be interconnected.

13. A diffuser according claim 3,
wherein the supply hose (6) in its longitudinal direction comprises 1-10 perforations/holes/pores per metre, and the distribution hose (7) in its longitudinal direction comprises 500-2000 perforations/holes/pores per metre.

14. A diffuser according to claim 8,
wherein said rubber of the supply hose (6) and said rubber of the distribution hose (7) is EPDM.

15. A diffuser according to claim 9,
wherein said diffuser hose (5) is from 1-1000 metres.

16. A diffuser according to claim 9,
wherein said diffuser hose (5) is from 10-100 metres.

17. A method for oxygenating water in aquaculture installations for marine organisms, wherein substantially pure oxygen in the form of oxygen-rich micro bubbles is added to the installation, and wherein the oxygen is supplied and distributed in the water through a diffuser(s), said diffuser(s) being a diffuser for oxygenating water by providing micro bubbles in aquaculture installations for marine organisms in the sea, wherein the diffuser is attached to an equipment for oxygen gas production and oxygen delivery, which optionally may be produced on the spot and stored in a suitable tank (4), wherein said diffuser is a hose (5) comprising a perforated supply hose (6) and at least a perforated distribution hose (7), and wherein the supply hose comprises fewer perforations/holes/pores than the distribution hose and wherein the perforations/holes/pores in the supply hose (6) are located along its entire circumference and in the longitudinal direction, or in a row/rank in the supply hose's (6) longitudinal direction, and that the perforations/holes/pores in the distribution hose (7) are located along its entire circumference and in the longitudinal direction, and wherein the supply hose (6) and at least one distribution hose (7) are arranged with parallel axes located in abutment against each other, wherein the supply hose only has perforations in the contacting surface between said supply hose and the distribution hose(s), with a resultant correspondence between these contact surface perforations in the supply hose and the distribution hose.

18. A method according to claim 17,
wherein the oxygen that is supplied and distributed is produced on site and stored in a tank (4) suited to the purpose or provided in the form of liquid oxygen from cryotank(s).

19. A method according to claim 18,
wherein the amount of oxygen added at any time is regulated and controlled by means of a control device (15) for regulating/controlling the oxygen admixture from the source (4), wherein the regulation is based on measurement of the water's oxygen content by means of oxygen probe(s) (14).

20. A method according to claim 19,
wherein the oxygen admixture is controlled/regulated according to the oxygen saturation in the water that has to be oxygenated or a more closely specified adjustment point/set point.

21. A method according to claim 20,
wherein the hoses (5) employed are mounted on an attachment device (12) suited to the purpose.

22. A method according to claim 21,
wherein the attachment device (12) with hose(s) (5), by means of an adjustable suspension means, is placed at depths from 2-25 metres.

23. A method according to claim 22,
wherein an oxygen saturation is obtained in the water that is in accordance with the aquaculture organism's needs.

24. A method according to claim 23,
wherein the oxygenation takes place in cages or other kinds of aquaculture installation.

25. A method according to claim 24,
wherein the oxygen is supplied at suitable locations and depths in the cage in such a manner that all the water in the cage receives a desired oxygen saturation.

26. A method according to claim 22,
wherein said attachment device (12) with hose(s) (5), by means of an adjustable suspension means, is placed at depths from 5-10 metres.

27. A method according to claim 23,
wherein an oxygen saturation is obtained in the water that is from 41-90%.

28. A method according to claim 23,
wherein an oxygen saturation is obtained in the water that is 85%.

29. A method according to claim 21,
wherein the oxygenation takes place in installations for rearing shellfish or crayfish.

* * * * *